Patented Mar. 9, 1954

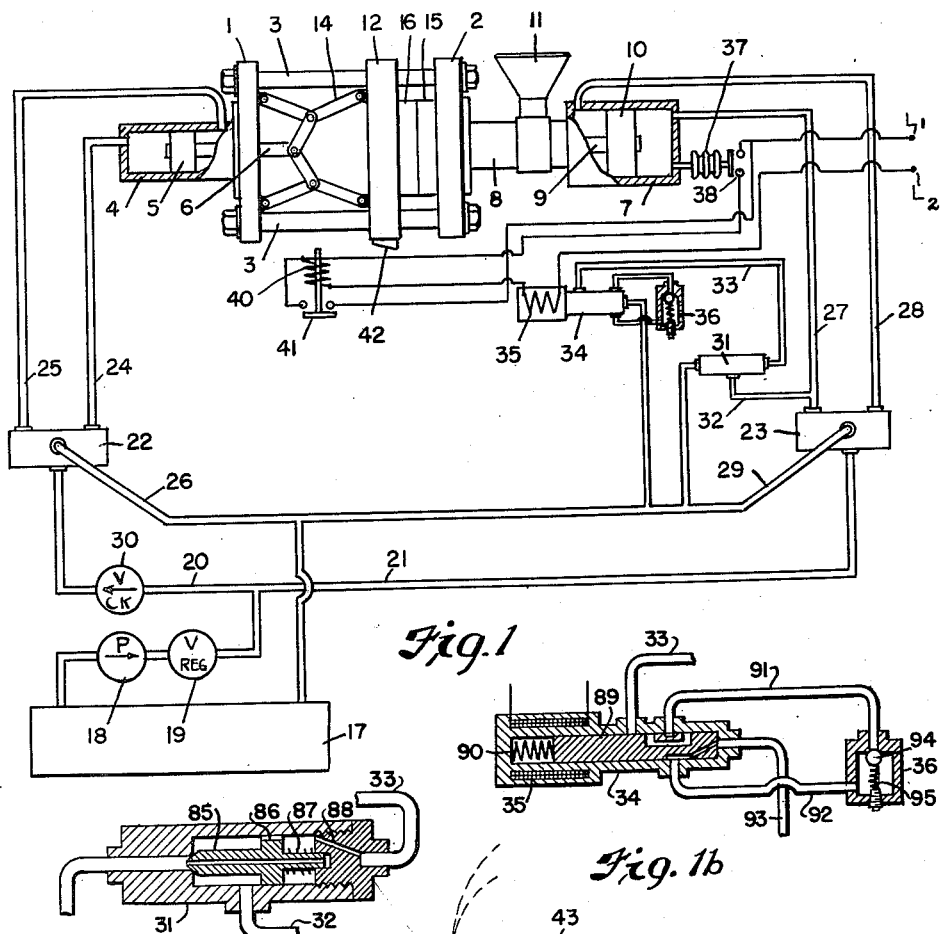
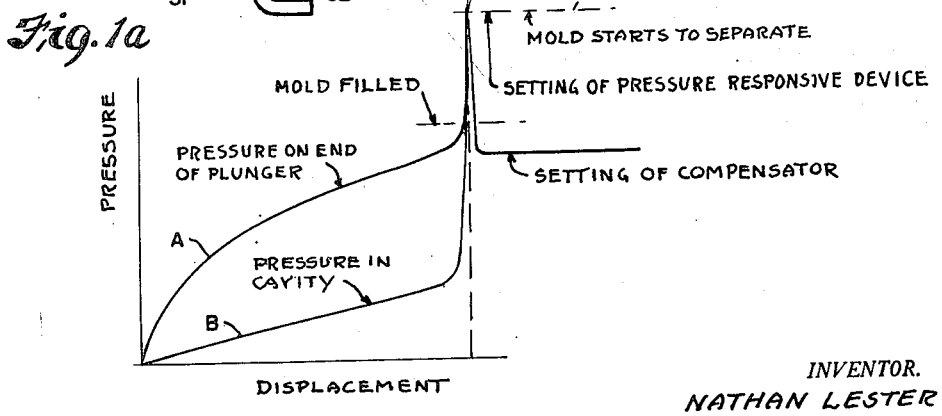

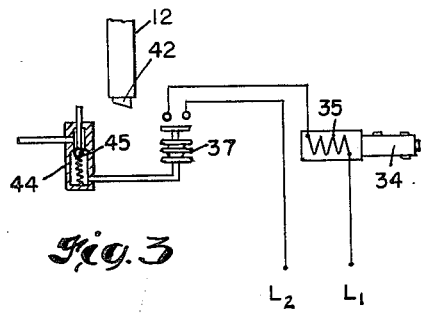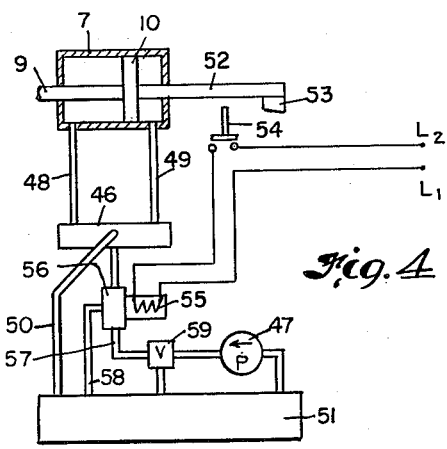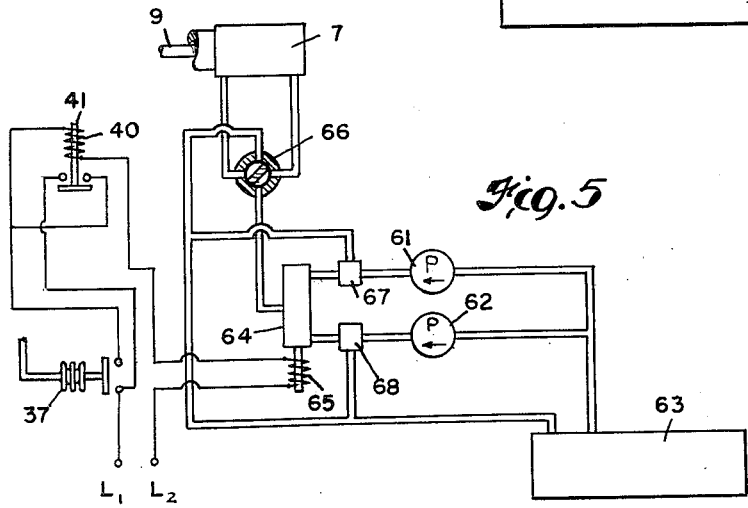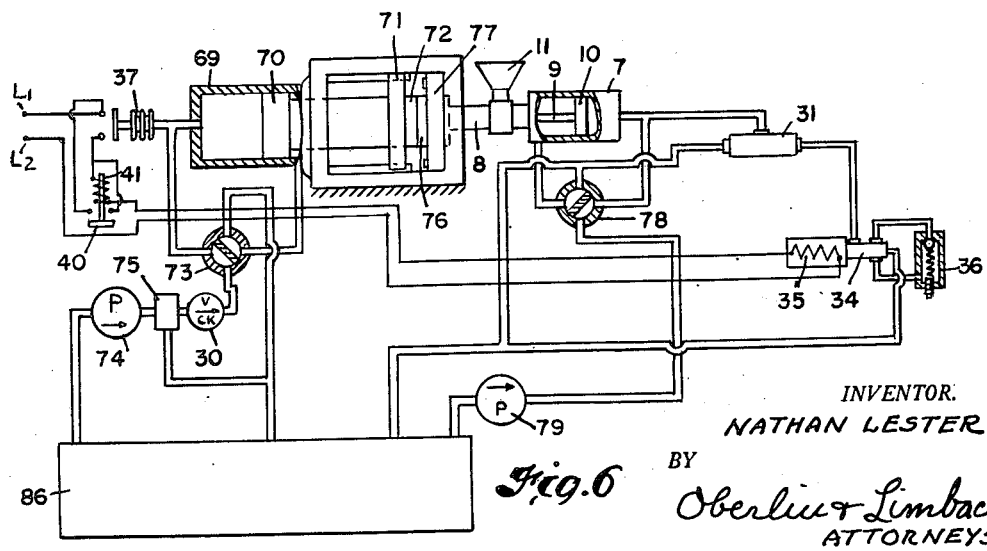

2,671,247

UNITED STATES PATENT OFFICE 2,671,247

MOLD OVERLOAD COMPENSATOR

Nathan Lester, Shaker Heights, Ohio, assignor to Lester Engineering Company, Cleveland, Ohio, a corporation of Ohio Application July 16, 1949, Serial No. 105,252

8 Claims. (Cl. 18—30)

The present improvements relate generally, as indicated to a mold overload compensator and more particularly to a unique method of and apparatus for controlling the pressure buildup of material injected into the mold of an injection molding, pressure casting, extruding, or transfer molding machine within desired limits for precluding the possibility of separation of the mold blocks at the parting line and resulting flashing of the material thereat, and for enabling the use of existing machines for forming pieces of larger cross-section in the parting plane of the molds than has been possible heretofore and the design of new machines of lighter construction than comparable machines now required.

In general, injection molding of thermoplastic material, for example, involves feeding of a metered quantity of material in pellet or like solid form into a heating or plasticizing chamber through which and wherefrom said material is forced as by a hydraulically actuated plunger through a discharge nozzle at one end of the chamber and through the sprue, gates, and runners of a closed mold into the mold cavity formed between the mold blocks or parts. Said plasticizing chamber usually comprises a heated cylinder provided with a spreader (also preferably heated) operative to relatively thinly spread the material so that it will rapidly pick up heat from the cylinder and spreader walls and thereby be transformed to a thick semi-fluid mass just before it flows through said discharge nozzle. Said mold generally comprises separable parts or blocks forming a mold cavity therebetween and is actuated through a hydraulic ram and toggle link mechanism which applies a relatively great clamping force on the mold parts so as to resist parting thereof due to the building up of the pressure of the material in the mold cavity.

As an illustrative example, it is evident that in a machine capable of exerting a pressure of 30,000 p. s. i. on the material in the heating chamber and a closing force on the mold of 600 tons and having a mold in which the cavity is 170 in.² in the parting plane, separation of the mold parts will occur shortly after the mold cavity is filled and as soon as pressure of the mold material therein exceeds about 7,000 p. s. i., thereby causing flashing of the mold and possible overstressing of certain parts of the machine, particularly under conditions where the material is overheated and would attain a pressure of about 90% of the pressure exerted on the material in the plasticizing chamber except for the relief provided by the separating of the mold parts.

Accordingly, in order to eliminate such objectionable separation and flashing of the mold in the absence of a suitable control, either the injection pressure or the size of the molding cavity must be reduced to a low value of less than one-fourth of that indicated, or else the machine must be correspondingly strengthened with respect to the frame and the mold closing mechanism. However, rather than cutting down the high pressure in the plasticizing chamber which it is desirable to maintain for properly conditioning the plastic material and for shortening the injection cycle, and rather than rendering the machine unduly large and bulky relative to the size of the mold usable therewith, it is herein proposed to employ high pressure injection and to take advantage of that characteristic of injection molding machines which permits high pressure compression of the material in the plasticizing chamber for the purposes aforesaid without causing application of undue pressure in the mold so long as the mold is only partly filled and the material is moving thereinto. As evident, so long as there is any movement of the material from the plasticizing chamber into the mold, the pressure within the mold will be so low that it is virtually impossible to flash the mold at that time, the pressure being low because of the pressure drop in the plasticizing chamber, the nozzle, and the sprue, gates and runners of the mold. Then upon filling of the mold cavity, it has been discovered that the pressure required to be held on the material as it sets up in the mold need only be a minor fractional portion of the pressure required to fill and form the material; and as a result high pressure can be applied on the material during substantially the entire injection stroke and followed by a lower adjustable holding pressure to keep the material from shrinking within the mold as it sets up therein. Such lower pressure permits the use of larger molds with present apparatus and enables the design of new apparatus of considerably lighter construction and without flashing of molds as heretofore encountered.

Hitherto, and as disclosed in my prior Patent No. 2,433,132, dated September 23, 1947, this problem has been solved by the provision of a control or mold overload compensator which is actuated to reduce the pressure on the material in the mold upon minute separating movement of the mold parts.

Herein it is proposed to render the control for reducing the pressure of the material in the mold responsive to pressure rather than to minute separating movement of the mold parts, as contemplated in the aforesaid patent.

Briefly outlined, the present method involves feeding of a predetermined quantity of solid material into the plasticizing chamber, applying a predetermined pressure on the material as by a hydraulically actuated ram, accurately controlling the temperature of the plasticizing chamber, and setting a pressure responsive device which, upon actuation, effectuates a desired reduction in the pressure on the material in the mold.

Accordingly, it is among the primary objects of this invention to provide a unique method of injection molding and a novel apparatus in which the signal for reducing the injection pressure is given by a pressure responsive device which has been adjusted in relation to the pressure exerted by the material in the mold subsequent to filling of the mold and prior to or at the time of separation of the mold parts by the building up of pressure therein.

It is another object of this invention to provide a unique method and apparatus for predeterminedly reducing the pressure of the material in the mold during setting thereof whereby, in instances where flashing of the mold is not likely or possible because of the relatively small cross-sectional area of the molded articles in the parting plane of the mold parts, the application of such reduced pressure on the material subsequent to filling of the mold eliminates the problem of sticking of the molded or cast articles in the mold. The prior practice in such cases has been simply to reduce the injection pressure ab initio but this introduces other problems which result in inferior molded articles.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail several illustrative embodiments of the invention, these being indicative, however, of but a few of the various ways in which the principle of the invention may be employed.

In said annexed drawings—

Fig. 1 is a schematic diagram of one embodiment of this invention;

Figs. 1a and 1b are cross-section views of valves for effecting pressure reduction;

Fig. 2 illustrates typical curves of the pressure of the material in the plasticizing chamber and in the mold cavity plotted against displacement of the material;

Fig. 3 is a fragmentary view illustrating a modification in which a pressure switch is held in actuated position by a check valve rather than a holding relay as in Fig. 1;

Fig. 4 is a fragmentary schematic view of an injection pressure control responsive to movement of the injection plunger to a preselected position;

Fig. 5 is a fragmentary schematic view of an injection pressure control including a dual pump system; and Fig. 6 is a schematic view of another embodiment which includes a straight hydraulic mold clamping circuit and a separate injection circuit.

The injection molding machine illustrated in Fig. 1 comprises members 1 and 2 secured together in spaced relation as by a plurality of parallel tie-bars 3 extending from one member to the other, said member 1 having mounted thereon a mold closing cylinder 4 with a piston 5 reciprocable therein and having its rod 6 extending toward said member 2. Said member 2 herein constitutes the fixed platen of the machine and carries the injection cylinder assemblage 7 thereon, said assemblage including a heating or plasticizing cylinder or chamber 8 outwardly adjacent the fixed platen 2 in which chamber the injection plunger 9 constituting the piston rod of the piston 10 in cylinder 7 is reciprocable and a material supply hopper 11 into which solid thermoplastic material is adapted to be loaded and dispensed in metered quantity into the plasticizing chamber 8 in advance of the inner end of plunger 9 when said plunger is retracted toward the right as viewed in Fig. 1.

Mounted for sliding movement on the tie-bars 3 and between member 1 and fixed platen 2 is a movable platen 12 actuated toward and away from said fixed platen 2 by piston 5 and a double toggle mechanism 14 pivotally connected as shown to the piston rod 6, to the member 1, and to the movable platen 12, said mechanism being arranged to effect a large multiplication of the force exerted by piston 5 whereby to enable tight clamping together of the mold parts 15 and 16 which are respectively attached to the platens 2 and 12 for resisting separation of the mold parts upon filling of the mold cavity which is defined by said mold parts with material injected from the plasticizing chamber 8.

The typical hydraulic system for controlling said pistons 5 and 10 comprises a reservoir 17, a motor driven pump 18 having its intake side connected to said reservoir and having a pressure regulating valve 19 associated therewith for maintaining a predetermined pressure in the lines 20 and 21 which are connected to the respective cylinders through the intermediary of conventional four-way reversing valves 22 and 23. Valve 22 is selectively operative to direct fluid under pressure through one of the lines 24 and 25 to control the direction of actuation of piston 5 in the mold closing cylinder 4 and to return the fluid displaced by said piston through the other of said lines, through said valve 22 to the reservoir 17 by way of line 26. The other valve 23 is similarly selectively operative to direct fluid under pressure from line 21 through either of the lines 27 or 28 to correspondingly actuate the injection cylinder piston 10 in a desired direction and to return the fluid displaced by the movement of said piston through the other of said lines, through said valve 23 and line 29 to the reservoir 17. A check valve 30 is preferably interposed in the pressure line 20 which leads to the four-way valve 22 to maintain a desired mold closing pressure irrespective of the reduced pressure which is subsequently applied on the injection cylinder piston 10 as will hereinafter appear. It will be apparent to those skilled in the art that said four-way valves 22 and 23 may be either manually actuated or, if desired, they may be automatically operated in timed sequence by appropriate solenoids, cams, or other well-known expedients.

The injection pressure control herein depicted includes a relief or bleeder valve 31 in a branch line 32 connected to the injection cylinder line 27 which leads to the head end of the injection cylinder 7, said relief valve being of conventional form having a valve member therein as hereinafter described which is retained in a seated position by a body of fluid acting on said valve member and trapped in the line 33 between said relief valve 34 and a solenoid operated valve 34, the latter being operative when the solenoid 35 is energized to establish communication between the line 33 and a pilot relief valve 36 which is set to open at any desired pressure between zero and the maximum pressure in line 27. Therefore a build up of fluid pressure in lines 21 and 27 to such predetermined pressure to which the pilot relief valve 36 is set will permit unseating of the valve member in said relief valve 31 and cause a consequent reduction in the fluid pressure in line 27 thereby reducing the pressure applied on the material in chamber 8 and in the mold 15—16.

Energization of solenoid 35 is effected as by a pressure switch 37 exposed to fluid pressure in cylinder 7 or line 27 acting on piston 10. As evident, when the pressure reaches a desired maximum, the switch contacts 38 will be closed by the switch 37 to energize solenoid 35 and also the coil 40 of a holding relay 41, the latter holding the solenoid 35 energized when the switch 37 opens by reason of the reduction of the pressure in line 27 in the manner previously indicated. Thus, the desired reduced pressure insufficient to flash the mold is held while the material in the mold cavity sets up. The solenoid 35 is de-energized during the opening of the mold as by a cam 42 on the movable platen 12, which engages the relay contactor 41 and opens the contacts thereof.

In general, the setting of the pressure responsive device or switch 37 for a prescribed mold and plastic material and certain operating pressures and temperatures may be a trial and error proposition involving the forming of several test pieces with said device set at different pressures.

As best shown in Fig. 1a, the valve 31 has a valve member 85 therein in the form of a piston, said piston having an orifice 86 therethrough affording restricted communication between the chambers on opposite sides of said piston. So long as the pressure of the oil in said chambers is equal, the spring 87 acting on said valve member 85 will hold the same in a seated position closing communication between the pipe 32 and the pipe at the left of said valve which leads to the reservoir 17.

The pipe 33 which is connected to the right-hand end of said valve 31 has communication with the right-hand chamber through a relatively large size passage 88 and, as shown in Fig. 1 and in Fig. 1b, the other end of pipe 33 is connected to the valve 34. When the solenoid 35 associated with said valve 34 is deenergized, the valve member 89 in said valve will be urged by the spring 90 toward the right as viewed in Fig. 1b, so as to block the flow of oil through the pipe 33. Accordingly, said valve member 85 in valve 31 remains in its seated position so long as no oil is flowing from the left-hand chamber to the right-hand chamber. In the deenergized position of valve 34 both the inlet and discharge passages of valve 36 are connected to the reservoir through the pipes 91 and 92 and passages in the valve member 89, which lead to the pipe 93, the latter being connected to the reservoir 17.

When solenoid 35 is energized, said valve member 89 will shift toward the left to communicate the pipe 33 to the pipe 91 which leads to the intake of the valve 36. Because the pressure in pipe 33 is substantially equal to the pressure of the oil in the pipe 32, the valve member 94 in valve 36 will immediately be unseated by reason of the lower pressure which is exerted thereon by spring 95, whereby oil will flow through valve 36 to the reservoir 17 by way of the valve 34 as just described. The resulting flow of oil through pipe 33 will effect a reduction in the pressure of the oil in the right-hand chamber of valve 31 to a value less than the pressure of the oil in the left-hand chamber because the oil is being conducted to reservoir 17 through valve 36 more rapidly than the oil can flow through the orifice 86 to maintain a high pressure in the right-hand chamber. Therefore the difference in pressure of the oil on opposite sides of the piston-like valve member 85 will cause said valve member to shift toward the right as viewed in Fig. 1a whereby to open communication between pipe 32 and the pipe at the left-hand end of said valve which leads to the reservoir 17. Such flow of oil through pipe 32 will immediately cause a reduction in the pressure of the fluid applied through pipe 27 in the piston 10.

As soon as the solenoid 35 is deenergized, the valve member 89 will be shifted by spring 90 toward the right to block the flow of oil through the pipe 33 whereupon the pressure in the left-and-right-hand chambers of valve 31 will become equalized so that the force exerted by spring 87 will shift valve member 85 to seated position whereby the pressure in pipes 32 and 27 may again build up.

In Fig. 2 the curve A is the pressure of the material in the plasticizing chamber plotted against the displacement of the injection plunger 9 and the curve B is the pressure of the material in the mold cavity plotted against the volume of material injected into the mold. As shown, the pressure of the material in the plasticizing chamber more or less progressively increases during the injection stroke and then abruptly increases to maximum upon filling of the mold. Likewise, the pressure of the material in the mold cavity is relatively low during the major portion of the mold cavity filling operation and then abruptly rises to a maximum when the mold cavity is filled. The pressure to which the material in the mold cavity rises during the filling operation may vary between 30–90% of the pressure which is built up in the plasticizing chamber, depending upon the material and the temperature to which it is heated, and other factors which need not be here considered. However, as soon as the mold cavity is filled, the pressure of the material in the plasticizing chamber and mold cavity become substantially equal as shown whereupon continued actuation of the injection plunger would cause the pressure in the cavity to exceed the force holding the mold closed, thereby causing separation of the mold parts and flashing of the material. In any case, if the pressure of the material in the mold cavity at the time of filling of the mold and at the time of separation of the mold parts 15 and 16 is as indicated by the dash line 43, then the pressure responsive device 37 should be set so that it will close the electric circuit through the solenoid 35 when the pressure of the material in the mold cavity reaches or is just below the value denoted by line 43. Obviously, the setting of said device 37 in terms of pounds per square inch may not correspond with the unit pressure on the material in the mold cavity because of loss in pressure due, for example, to the friction of the machine parts, but nevertheless said device, when properly set will effectuate through the solenoid operated valve 34 and the relief or bleeder valve 31 the desired reduction in pressure exerted on the material in the mold cavity after filling of the mold and maintenance of the reduced pressure during the setting of the material.

The operation of the control described above after having set the pressure responsive device 37 is as follows.

The four-way valve 22 is actuated to direct fluid under pressure from line 20 and through line 24 to the head end of the mold closing cylinder 4 to move the piston 5 therein toward the right to thus clamp together the mold parts 15 and 16 between the platens 12 and 2. During such movement of the platen 12, the cam 42 thereon disengages from the relay contactor 41 to render the relay operative upon subsequent operation of switch 37. With the injection plunger 9 retracted toward the right, a measured quantity of material is fed from the hopper 11 into the plasticizing chamber 8. The four-way valve 23 is then actuated to direct fluid under pressure from line 21 and through line 27 into the head end of the injection cylinder 7 to thus urge the injection plunger 9 toward the left to cause the material in the plasticizing chamber to be forced through and plasticized in said chamber and thence forced into the mold cavity formed between the mold parts 15 and 16.

Now, when the mold has been filled, the pressure of the material in the mold will abruptly buildup as shown in Fig. 2 and similarly the pressure of the material in the chamber 8 will build up, raising the fluid pressure in cylinder 7 and line 27 to an extent sufficient to actuate the pressure responsive device 37. Immediately upon actuation of said device 37 the solenoid 35 is energized and as a consequence the relief or bleeder valve 31 opens to cut down the injection pressure to a valve low enough to preclude flashing of the material from the mold. Moreover, the holding relay 41 maintains the solenoid circuit whereby the subsequent reduction of pressure in line 27 and opening of switch 37 will not de-energize solenoid 35. Thus a reduced pressure is maintained on the material in the mold until the plunger 9 is retracted and the mold closing cylinder is actuated in a direction to open the mold, the opening of the mold causing engagement of cam 42 with the relay contactor 41 to de-energize solenoid 35. De-energization of solenoid 35 effects actuation of valve 34 and closing of valve 36 whereby the relief or bleeder valve 31 likewise closes and upon retraction of the injection plunger 9 by the actuation of the four-way valve 23 and the loading of material into the plasticizing chamber 8 the machine is put into condition for repeating the above cycle.

Although the typical control herein disclosed comprises a pressure responsive device or switch 37 in the injection circuit, it will be apparent without illustration that such pressure responsive device may in some instances be installed in the mold closing cylinder circuit (in line 24 for example) in which event the setting of the device would be in relation to the pressure exerted by the material in the mold cavity tending to open the mold. Furthermore, the device 37, solenoid valve 34, and relief or bleeder valve 31 may be replaced by a suitable unloading or reducing valve as hereinafter described which is operative to reduce the fluid pressure after it reaches a predetermined maximum, the reduced pressure being sufficient to retain the valve open so as to maintain such reduced pressure on the material during setting up thereof in the mold. It is to be further noted that because the filling of the mold and subsequqent separation of the mold parts 15 and 16 occurs at certain points for a prescribed mold and material with reference to the stroke of the injection plunger 9, it may be feasible to render the pressure control device operative upon the plunger reaching a predetermined position. Still another alternative is to provide high and low pressure pumps as also hereinafter described and a control valve so interconnected that when a predetermined maximum pressure has been reached corresponding to a value between the filling of the mold and the separation of the mold parts, that the high pressure pump is rendered inoperative and the low pressure pump is rendered operative.

Referring now to Fig. 3, the holding relay 41 has been replaced by a check valve 44 having its outlet communicating with pressure switch 37 and its inlet optionally connected to cylinder 7 or line 27 or to the mold closing cylinder 4 or line 24. As evident, said check valve 44 will trap fluid in the switch 37 whereby the energization of solenoid 35 by said switch and consequent reduction of pressure in the injection circuit will not cause opening of said switch. The switch 37 is opened by the cam 42 on the movable platen 12 which cam during the opening of the mold engages the valve member 45 in said check valve.

In Fig. 4 there is disclosed a modification which comprises a four-way valve 46 for selectively directing fluid under pressure delivered by the pump 47 through the lines 48 and 49 to the opposite ends of the injection cylinder 7. The fluid displaced by the piston 10 flows through line 50 to reservoir 51. In this form of the invention the piston 10 is provided with an extension 52 provided with a cam 53 operative upon injection movement of plunger 9 to a position corresponding with the filling of the mold cavity with material to engage and close the switch 54, closing of said switch energizing the solenoid 55 of a bypass or bleeder valve 56 installed in the discharge line 57 from pump 47. The operation of valve 56 by energizing solenoid 55 causes a desired portion of the pump delivery to flow into reservoir 51 by way of line 58 whereby the pressure of the fluid acting on piston 10 is reduced to a value insufficient to cause flashing of the molding material and is maintained at such reduced value during setting up of the material.

When the four-way valve 46 is actuated to retract the injection plunger 9, cam 53 disengages from switch 54, thereby opening said switch and de-energizing solenoid 55 to close the bypass line 58 until the plunger 9 is again moved to the predetermined position whereat cam 53 engages switch 54. A relief valve 59 prevents building up the pump delivery pressure to undesirable limits.

In Fig. 5 is shown a dual pump injection circuit comprising a high pressure pump 61 and a low pressure pump 62 having their intake sides in communication with a fluid supply reservoir 63 and their discharge sides leading to a solenoid operated selector valve 64 of any desired construction operative when the solenoid 65 thereof is de-energized to permit delivery of fluid by pump 61 through reversing valve 66 to the injection cylinder 7 and block the delivery by pump 62 and when the solenoid 65 is energized to permit delivery of fluid by pump 62 through reversing valve 66 to the injection cylinder 7 and block the delivery by pump 61. Solenoid 65 is energized as by the pressure switch 37 which is connected optionally to the mold closing or to the injection circuit and actuated upon building up of pressure in one of said circuits to a value approaching that which will cause separation of the mold. The holding coil 40 of the holding relay 41 again maintains the reduced pressure applied on the material through injection plunger 9 during the setting up of the material. The relay contactor 41 will preferably be actuated to open the contacts thereof by cam 42 on the movable platen 12 as illustrated in Fig. 1. A further modification is to provide a check valve 44 in lieu of the holding relay 41 as explained in connection with Fig. 3.

In Fig. 5 the numerals 67 and 68 denote unloading valves operative not only to unload the pumps 61 and 62 when the delivery thereof is blocked either by valve 64 or the piston 10 reaching the ends of its strokes but also to unload and bypass the pump delivery when flow of fluid to the injection cylinder ceases, as when applying pressure on the molding material during the setting up of the material. Thus, the valves 67 and 68 are bleeder valves to maintain desired pressure delivery to the injection cylinder.

A further modification as illustrated in Fig. 6 comprises a mold closing cylinder 69, the piston 70 of which has a direct connection with the movable platen 71 carrying a die block 72, said piston being reciprocated by manipulation of the reversing valve 73 which selectively directs delivery of fluid from pump 74 to opposite ends of said cylinder. A regulating valve 75 on the pressure side of the pump maintains a desired fluid pressure holding the mold comprising die blocks 72 and 76 in closed position.

The fixed platen 77 on which die block 76 is carried has the injection cylinder assemblage 7 mounted thereon including the heating chamber 8, the hopper 11, and the injection plunger 9 as previously described and reciprocation of piston 10 in said cylinder is controlled as by a reversing valve 78 which selectively directs the delivery of pump 79 into one end or the other of said cylinder.

In this case, the compensator is the same as that illustrated in Fig. 1 comprising the relief or bleeder valve 31, valve 34 operated by solenoid 35, pilot relief valve 36, holding relay 41 which includes a coil 40, and pressure switch 37, said switch being closed when the pressure of the fluid in cylinder 69 reaches a predetermined maximum. The holding relay 41 may be opened manually or by a cam as previously described. To enable a rise in pressure in cylinder 69 responsive to filling up of the mold cavity and buildup of pressure therein tending to open the mold parts 72 and 76, a check valve 30 is installed on the high pressure side of pump 74. Otherwise the operation of the apparatus of Fig. 6 is the same as that of Fig. 1 and need not now be repeated.

As apparent from the foregoing, the elimination of the "flashing" of the mold is not the sole problem solved by the employment of the present method and apparatus but in addition, the application of high pressure on the material assures proper conditioning of the material and complete filling of the mold while the application of a reduced pressure on the material in the mold after filling thereof eliminates the problem of sticking of the molded article in the mold which has heretofore been remedied by application of reduced pressure on the material during the entire molding cycle but at the expense of inferior molded articles.

Moreover, while the foregoing description is primarily concerned with an injection molding method and apparatus it will be apparent to those skilled in the art that the same basic principles are applicable as well to extrusion molding, die casting, and transfer molding with regard to application of high pressure on the material while flowing into the mold and application and maintenance of reduced pressure on the material in the mold subsequent to filling of the mold.

Other modes of applying the principle of the invention may be employed, change being made as regards the details described, provided the features stated in any of the following claims, or the equivalent of such, be employed.

I therefore particularly point out and distinctly claim as my invention:

1. A molding apparatus comprising a separable mold; an injection cylinder having a chamber for molding material in communication with said mold; an injection plunger and fluid pressure actuating means therefor for moving said plunger in said cylinder to displace molding material from such chamber into said mold to form a molded article in the latter; means for delivering fluid under pressure to said actuating means, a valve for controlling the flow of fluid to said actuating means, a fluid pressure reducing device and control means therefor, said device having a bleeder valve and being operative when actuated by said control means to cause the fluid delivered by said delivery means to bypass said actuating means and to substantially reduce the pressure of the fluid acting on said actuating means to thus reduce the force exerted by said means on said plunger, and said control means being operative to thus actuate said device in response to buildup of the pressure of the material filling said mold to a predetermined value; and holding means operated by said control means and effective when thus operated to maintain said device in its actuated condition aforesaid during application of pressure on the material of magnitude less than that initially required to actuate said control means whereby to avoid overloading of said mold after being filled and to permit solidification of the material in said mold under substantially reduced pressure, such solidification of the material under reduced pressure facilitating removal of the molded article from said mold.

2. The apparatus of claim 1 wherein said bleeder valve is solenoid operated, and said control means includes a normally open pressure responsive switch which is closed to energize the solenoid of said valve to thus actuate the latter, and said holding means is a holding relay in circuit with said solenoid and operated by the closing of said switch to maintain the energization of said solenoid.

3. The apparatus of claim 1 wherein said control means is in the form of a pressure responsive switch for operating said valve whereby the bypassing of fluid by the latter substantially reduces the fluid pressure available for the actuation of said plunger actuating means.

4. The apparatus of claim 1 wherein said bleeder valve is solenoid operated, and said control means includes a normally open pressure responsive switch having its contactor actuated by predetermined build-up in pressure of the fluid which is utilized for operation of said plunger actuating means, to energize the solenoid of said valve and thus to actuate said valve.

5. The apparatus of claim 1 wherein means responsive to the opening of said mold renders said holding means ineffective to maintain said device in its actuated condition whereby, during the next filling of said mold with molding material, said holding means is in a condition to be operated by said control means.

6. The apparatus of claim 1 wherein said plunger actuating means is operated by fluid under pressure delivered thereto by a pump, and said pressure-reducing device and control means therefor respectively include a solenoid operated valve which, when the solenoid thereof is energized, closes communication between said pump and said plunger actuating means and opens communication between another pump delivering a substantially reduced pressure and said plunger actuating means and a normally open pressure responsive switch which is closed by predetermined pressure build-up as aforesaid to energize said solenoid, said bleeder valve being located between said another pump and said solenoid operated valve to bypass fluid to maintain such reduced pressure.

7. The apparatus of claim 1 wherein fluid pressure actuating mold closing means are provided for holding said mold in closed position in opposition to the pressure of the material injected thereinto tending to open said mold, and said control means is responsive to the fluid pressure built up in said mold closing means.

8. The apparatus of claim 1 wherein said holding means comprises a check valve operative to trap fluid under pressure in said control means, and a cam is provided on said mold which, during opening of said mold, opens said check valve to relieve such trapped fluid under pressure in said control means and consequently render said holding means ineffective to maintain said device in its actuated condition.

NATHAN LESTER.

References Cited in the file of this patent

UNITED STATES PATENTS

| Number | Name | Date |
|---|---|---|
| 2,035,801 | Gastrow | Mar. 31, 1936 |
| 2,187,212 | MacMillin | Jan. 16, 1940 |
| 2,202,140 | Burroughs | May 28, 1940 |
| 2,232,679 | Tucker | Oct. 26, 1943 |
| 2,365,282 | Lester et al. | Dec. 19, 1944 |
| 2,372,833 | Jobst | Apr. 3, 1945 |
| 2,433,132 | Lester | Dec. 23, 1947 |
| 2,448,676 | MacMillin | Sept. 7, 1948 |
| 2,476,272 | Bauman | July 19, 1949 |